United States Patent [19]

Dicke et al.

[11] Patent Number: 4,701,515

[45] Date of Patent: Oct. 20, 1987

[54] THERMOTROPIC AROMATIC POLYESTER FROM 3,3'-DIPHENYL-4,4'-DIHYDROXY BIPHENYL AND ARYLENE DICARBOXYLIC ACID

[75] Inventors: Hans-Rudolf Dicke; Ludwig Bottenbruch, both of Krefeld; Karlfried Wedemeyer, Cologne; Klaus-Christian Paetz, Burscheid; Aziz El Sayed, Leverkusen, all of Fed. Rep. of Germany

[73] Assignee: Bayer Aktiengesellschaft, Leverkusen, Fed. Rep. of Germany

[21] Appl. No.: 858,667

[22] Filed: May 2, 1986

[30] Foreign Application Priority Data

May 14, 1985 [DE] Fed. Rep. of Germany ....... 3517270

[51] Int. Cl.$^4$ ............................................. C08G 63/18
[52] U.S. Cl. .................................... 528/176; 528/193; 528/194; 528/271; 528/86

[58] Field of Search ............... 528/176, 193, 194, 271, 528/86

[56] References Cited

U.S. PATENT DOCUMENTS

| | | | |
|---|---|---|---|
| 3,739,035 | 6/1973 | Webb et al. | 528/176 |
| 4,159,365 | 6/1979 | Payet | 528/176 |
| 4,474,938 | 10/1984 | Richardson | 528/176 |

FOREIGN PATENT DOCUMENTS

WO85/03712  8/1985  PCT Int'l Appl. ................ 528/176

*Primary Examiner*—Harold D. Anderson
*Attorney, Agent, or Firm*—Connolly and Hutz

[57] ABSTRACT

Thermotropic aromatic polyesters which contain 3,3'-diphenyl-4,4'-dihydroxydiphenyl radicals as diphenol radicals can be processed by thermoplastic methods without decomposition, in spite of the high heat distortion resistance.

15 Claims, No Drawings

THERMOTROPIC AROMATIC POLYESTER FROM 3,3'-DIPHENYL-4,4'-DIHYDROXY BIPHENYL AND ARYLENE DICARBOXYLIC ACID

The invention relates to high molecular weight thermotropic aromatic polyesters having a high heat distortion resistance and high thermal and chemical stability, a process for the preparation of these polyesters, and their use for the production of mouldings, filaments, fibres and films.

Substances which are designated as "thermotropic" are those which form liquid-crystalline melts. Thermotropic polyesters are sufficiently well known; see, for example, F. E. McFarlane et al., Liquid Crystal Polymers II, Contemporary Topics in Polymer Science, Vol. 2, Plenum Publishing Corporation, 1977;

W. J. Jackson and H. F. Kuhfuss, J. Polymer Science, Polymer Chem. Ed. 14, 2042 (1976);

W. E. Wooten et al. in A. Ciferri "Ultra-high Modulus Polymers", Applied Science Publ., London 1979, page 362 et seq.;

A. Blumstein et al., "Liquid Crystalline Order in Polymers", Academic Press 1978;

J. Preston, Angew. Makromol. Chem. 109/110, 1–19 (1982);

A. Ciferri, W. R. Krigbaum and R. B. Meyer, "Polymer Liquid Crystals", Academic Press, New York, 1982; EP-A No. 1185, 8855, 15,856, 17,310, 18,145, 22,344, 44,205 and 49,615;

U.S. Pat. Nos. 3,991,013, 3,991,014, 4,066,620, 4,083,829 and 4,107,134; and WO 79/797, 79/1030, 79/1040.

The Liquid-crystalline state of polyester melts can be investigated with the aid of a polarization microscope; for the investigations, the eyepiece was equipped with an attachment which contained a photodiode arranged at the focus of the ocular lens. Using a downstream amplifier with a control device, the measured value at the switched-on microscope was set at 100 scale divisions for parallel Nicol prisms in the absence of a sample of material. A value of 0.01 scale divisions was then obtained with crossed Nicol prisms.

The layer thickness of the polyester melts investigated was 100 μm.

The investigation of the polyesters was carried out after the samples had been melted at temperatures between 300° and 430° C. If lightening of the melt observed between the crossed Nicol prisms occurred in this entire range or in a part of it, the polyester was classified as thermotropic liquid-crystalline.

In the measuring arrangement, the liquid-crystalline polyesters give values greater than 1 scale division, in general values from 3 to 90 scale divisions. On the other hand, for amorphous melts, for example aromatic polycarbonates, values of less than 0.1 scale division were found.

The method described above is particularly suitable for a rapid determination in the laboratory, and gives unambiguous results in virtually all cases. On the other hand, in cases of doubt, it may be reasonable to demonstrate the presence of liquid-crystalline components by means of wide angle X-ray scattering in the melt, as described in, for example, G. W. Gray and P. A. Windsor, "Plastic Crystals, Physico-Chemical Properties and Methods of Investigation", in particular Chapter 3, John Wiley & Sons, New York, Sydney, Toronto, 1974.

Thermotropic polyesters can be converted to mouldings and films by thermoplastic deformation, and to filaments and fibres having extraordinary mechanical properties by spinning from the melt. However, a precondition is that the polyesters can be melted without decomposition.

The simplest fully aromatic polyesters, such as, for example, poly(4-hydroxybenzoate) and poly-(1,4-phenylene terephthalate), do not satisfy these preconditions; they melt with decomposition only at about 600° C.

Thermotropic polyesters obtained from three or more monomers can be processed by thermoplastic methods (DE-OS (German Published Specifications) Nos. 2,704,315, 2,721,786, 2,751,653, 2,834,537, 2,844,817, 2,932,178 and 2,963,833, EP-A Nos. 1340, 30,182 and 69,587, and U.S. Pat. Nos. 4,153,779, 4,245,082, 4,279,803, 4,355,134, 4,371,660 and 4,391,966). However, the common feature of all these products is that the desired reduction in the melting point is accompanied by an undesired reduction in the heat distortion resistance. In some cases, the heat distortion resistance can be increased by means of thermal post-treatment of the filaments, fibres, films or mouldings produced from these thermotropic copolyesters. However, the thermal post-treatment is uneconomical.

It was an object of the invention to provide thermotropic aromatic polyesters which can be processed by thermoplastic methods without decomposition, in spite of high heat distortion resistance.

The heat distortion point (without thermal post-treatment) should be at least 200° C., preferably at least 250° C. and in particular at least 300° C. (measured in each case according to Vicat A, DIN 53,460, ISO 306).

The temperature of the transition from the crystalline phase to the liquid-crystalline phase (melting point) determined by DSC should be less than 420° C., preferably less than 400° C.

Furthermore, the new thermotropic polyesters should be sufficiently thermally stable at temperatures above the melting point. In the case of isothermal gravimetric analysis (30 min/400° C.), a weight loss of 5, preferably 3, % by weight should not be exceeded.

Surprisingly, it has been found that thermotropic polyesters possess the desired combination of advantageous properties when their diphenol radicals consist predominantly or solely of 3,3'-diphenyl-4,4'-dihydroxydiphenyl radicals.

The invention therefore relates to thermotropic polyesters consisting of aromatic dicarboxylic acid radicals, diphenol radicals and, if appropriate, radicals of chain terminators and/or branching agents, characterized in that at least 90 mol %, preferably at least 95 mol %, in particular at least 98 mol %, of the diphenol radicals are 3,3'-diphenyl-4,4'-dihydroxydiphenyl radicals.

These radicals correspond to the formula

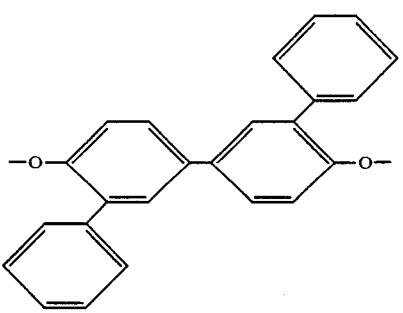 (I)

3,3'-diphenyl-4,4'-dihydroxy-diphenyl is known; J.Org. Chem., Vol. 34, page 1160 (1960).

The diphenol radicals of particularly preferred polyesters consist completely of 3,3'-diphenyl-4,4'-dihydroxydiphenyl radicals.

Preferred aromatic dicarboxylic acids correspond to the formula

  (II)

wherein A denotes a bivalent aromatic radical having 6 to 24 C atoms, preferably having 8 to 16 C atoms. Preferred aromatic radicals A are those in which the two bonds to the carboxyl groups extend coaxially in opposite directions, such as, for example, in 1,4-phenylene, 1,4-naphthylene or 4,4'-biphenylene, or in which the bonds pointing in opposite directions are displaced parallel to one another, such as, for example, in 1,5-naphthylene, 2,6-naphthylene or 3,5'-biphenylene. Other preferred aromatic dicarboxylic acids are 4,4'-trans-stilbenedicarboxylic acid, 4,4'-tolanedicarboxylic acid and 4,4'-azobenzenedicarboxylic acids. Terephthalic acid is particularly preferred.

Polyesters according to the invention can contain mixtures of the dicarboxylic acid radicals described above; however, polyesters which contain only one of the stated components as dicarboxylic acid radicals in each case are preferred.

In addition to 3,3'-diphenyl-4,4'-dihydroxydiphenyl radicals, the polyesters according to the invention can contain up to 10 mol %, relative to the diphenol radicals, of radicals of other diphenols having 6 to 18 C atoms, such as, for example, radicals of hydroquinone, resorcinol, bisphenol A, 4,4'-dihydroxydiphenyl ether, 4,4'-dihydroxydiphenyl sulphide or 4,4'-dihydroxybenzophenone.

In addition to radicals of the preferred dicarboxylic acids II, the polyesters according to the invention can contain up to 10 mol %, relative to the dicarboxylic acid radicals, of radicals of other aromatic dicarboxylic acids having 8 to 24 C atoms, of aliphatic dicarboxylic acids having 4 to 14 C atoms, of cycloaliphatic dicarboxylic acids having 8 to 16 C atoms, of araliphatic dicarboxylic acids having 10 to 18 C atoms and/or hydroxycarboxylic acids having 7 to 19 C atoms. Preferred examples of such co-acids are isophthalic acid, succinic acid, adipic acid, sebacic acid, hexahydrophthalic acid, hexahydroisophthalic acid and hexahydroterephthalic acid, cyclohexanediacetic acid and p-hydroxybenzoic acid.

If the polyesters according to the invention contain other diphenol radicals in addition to the 3,3'-diphenyl-4,4'-dihydroxydiphenyl radicals, and other dicarboxylic acid radicals in addition to radicals of the aromatic dicarboxylic acids II, the sum of the co-components altogether should not exceed 10 mol %, relative to the sum of the diphenol and dicarboxylic acid radicals.

Polyesters according to the invention can contain up to 10 mol %, relative to the sum of ester and carbonate groups, of carbonate groups.

Homopolyesters of 3,3'-diphenyl-4,4'-dihydroxydiphenyl and terephthalic acid are particularly preferred.

The polyesters according to the invention can contain, as terminal groups, —COOH, —OH, —OC$_6$H$_5$, acyloxy or radicals derived from chain terminators. Preferred chain terminators are monofunctional aromatic hydroxy compounds, such as 4-hydroxydiphenyl, p-nonylphenol, 4-(1,1,3,3-tetramethyl-butyl)-phenol or β-naphthol, and aromatic monocarboxylic acids, such as benzoic acid, diphenylcarboxylic acids and naphthylenecarboxylic acids. Chain terminators can be employed in amounts of 0.5–5 mol, relative to diphenols in the case of monohydroxy compounds, and relative to dicarboxylic acids in the case of monocarboxylic acids.

Trifunctional monomers or monomers having a higher functionality, preferably trifunctional or tetrafunctional monomers—preferably aromatic monomers—such as, for example, phloroglucinol, 1,3,5-benzenetricarboxylic acid or 3,5-dihydroxybenzoic acid can be employed as branching agents, in amounts of 0.1 to 1 mol %, relative to dicarboxylic acids in the case of poly- and hydroxycarboxylic acids, and relative to diphenols in the case of polyols.

The polyesters according to the invention are insoluble in the solvents tested by us, such as, for example, p-chlorophenol and phenol/tetrachloroethane (1:1 parts by weight).

The melt viscosity of the polyesters according to the invention, measured in each case at 20° C. above the transition from the crystalline phase to the liquid-crystalline phase (usually between 350° and 430° C.) determined by DSC, using a nozzle having a length/diameter ratio of 20 at a shearing rate of $10^3$ sec $^{-1}$, is a rule 2 to 2000, preferably 5 to 1000, in particular 10 to 500, Pa.s.

The polyesters according to the invention can be prepared by reaction of the diphenols or their reactive derivatives, for example their $C_1$–$C_3$-acyl derivatives, with the dicarboxylic acids or their reactive derivatives, for example their dihalides or diesters, if appropriate in the presence of branching agents, chain terminators and/or catalysts, by various methods.

Carbonate groups can be introduced by using diphenyl carbonate.

The polyesters according to the invention can be prepared at temperatures from 160° C. to 400° C., and the reaction is generally begun at low temperatures and the temperature increased continuously as the reaction progresses. When the reaction rate decreases, a vacuum can be applied, the pressure preferably being reduced from atmospheric pressure to about 0.1 mbar.

In a preferred process, the diphenol diacetates, which may also be produced in situ, are reacted with dicarboxylic acids at temperatures from 160° to 400° C., if appropriate under reduced pressure.

In another preferred process, the dicarboxylic diesters are reacted with the diphenols at temperatures from 250° to 400° C. and under a pressure of 0.1 to 1000 mbar.

The product which is obtained may be subjected to a solid phase post-condensation preferably under reduced pressure at a temperature of from 220° to 380° C. After from 2 to 25 hours, the molecular weight has increased and the properties of the resulting polyester are further improved.

The starting compounds are, as a rule, employed in amounts such that the ratio of carboxyl functions to hydroxyl functions is from 0.95 to 1.05, preferably from 0.98 to 1.02.

The reactions can be carried out in the melt or in inert high-boiling solvents.

Preferred catalysts for the polycondensation are Lewis acids and hydrohalic acids; oxides, hydrides, hydroxides, halides, alcoholates, phenolates, salts of inorganic or organic acids (preferably salts of carboxylic acids), complex salts or mixed salts of the alkaline earth metals, such as, for example, magnesium or calcium; of the sub-group elements, such as, for example, vanadium, titanium, manganese, cobalt, nickel, zinc, lanthanum, cerium or zirconium, or of the elements from other groups of the Periodic Table, such as, for example, germanium, tin, lead and antimony, or the alkali metals or alkaline earth metals themselves, in particular sodium, such as, for example, sodium hydroxide, lithium acetate, magnesium acetate, cobalt acetate, zinc acetate, calcium benzoate, magnesium acetylacetonate, zinc acetylacetonate, vanadyl $C_1$–$C_8$-alkoxides, titanium alkoxides, such as titanium tetrabutylate or titanium tetrapropylate, alkoxytitanium silicates, zirconium butylate, zirconium propylate, titanium tetraphenolate, sodium phenolate, germanium dioxide, antimony trioxide, dialkyl- and diaryltin oxide, di-butyl-tindiacetate and di-butyl-dimethoxy-tin. Magnesium acetate, manganese acetate, sodium acetate, potassium acetate and zinc acetate, titanium tetrabutylate, titanium tetrapropylate and sodium phenolate are particularly preferred. The amounts of catalyst are preferably 0.001 to 1% by weight, in particular 0.01 to 0.2% by weight, relative to the total weight of monomers employed.

Because of their relatively low melt viscosity, the thermotropic polyesters according to the invention can be processed by a thermoplastic method to give injection moulded articles, filaments, fibres, ribbons and films. The resulting shearing forces cause molecular orientation which is influenced to a large extent by the magnitude of these forces. They also exhibit a pronounced structural viscosity, that is to say the melt viscosity decreases sharply when the shearing forces are increased. Suitable processing methods are injection moulding, extrusion, pressing and melt spinning.

Mouldings having high tensile strength, high heat distortion resistance and great dimensional stability can be produced from the polyesters according to the invention. Since the polyesters are extremely resistant to chemicals and flame-retardant, they are preferably used for the production of:

articles for the electrical industry, such as, for example, insulators, printed circuits, plug contacts, fittings, and coverings for integrated circuits, components for chemical apparatuses, such as, for example, pipes, container linings, rotors, sliding bearings and packings, components for the interior fittings in aircraft, and components of medical equipment, such as, for example, components of air-conditioning systems and valve parts.

However, the polyesters according to the invention can also be used as covering and coating material (in powder form or dispersed). They are also very suitable for the production of reinforced or filled moulding compositions containing from 5 to 65% by weight, relative to the reinforced and filled moulding composition, of reinforcing agents or fillers.

The invention therefore furthermore relates to the use of new polyesters for the production of mouldings, filaments, fibres and films.

The percentages in the Examples below relate in each case to weight.

EXAMPLES

The heat distortion resistance was measured by determining the Vicat A softening temperature according to DIN No. 53,460 (ISO 2306).

EXAMPLE 1

The following substances were weighed into a melt condensation apparatus which had been flushed with nitrogen and heated thoroughly and consisted of a 250 ml plane-ground vessel having a plane-ground lid, a stirrer, a nitrogen inlet and a distillation attachment:

95.45 g=0.3 mol of diphenyl terephthalate,
101.4 g=0.3 mol of 3,3'-diphenyl-4,4'-dihydroxydiphenyl and
0.1 g of titanium tetraisopropylate solution in chlorobenzene (1% strength).

The reaction mixture was heated to 280° C. under a gentle stream of nitrogen, by means of a salt bath. The temperature was increased to 300° C. in the course of one hour. Phenol distilled off. Further phenol was distilled off over a period of 1.5 hours by gradually increasing the temperature to 350° C. The amount of distillate at this time was 46.8 g (=83% of theory). By reducing the pressure to 4 mbar and at the same time further increasing the reaction temperature to 380° C., the elimination of phenol was completed in the course of 20 minutes. At the end of the reaction, the product solidified in the flask. After cooling, a beige-coloured polyester was obtained.

In the DSC investigation (apparatus used: Perkin Elmer DSC 2, heating rate: 20 K/min) a fusion peak was observed at 385° C. (total heat of fusion: 8.47 cal/g).

Under the polarization microscope, an anisotropic melt was observed at above 395° C.

The thermogravimetric analysis gave a weight loss of 1.8% for isothermal measurement (30 minutes/400° C.).

The softening temperature of the polyester was 335° C. (Vicat A).

The product was insoluble in p-chlorophenol and hexafluoroisopropanol.

EXAMPLE 2

The following substances were weighed into the reaction apparatus described in Example 1:

49.84 g=0.3 mol of terephthalic acid,
126.6 g=0.3 mol of 3,3-diphenyl-4,4'-diacetoxydiphenyl, and
0.05% of magnesium oxide and 0.05% of antimony trioxide, the percentages being relative to the weight of total amount of substances weighed in.

The reaction mixture was heated to 270° C. under a gentle stream of nitrogen by means of a salt bath. After 20 minutes at this temperature, it was heated further to 310° C., acetic acid distilling over. In the further course of the reaction, the temperature was kept at 310° C. for 30 minutes, then at 330° C. for 45 minutes and finally at 350° C. for 40 minutes. A vacuum was applied, and at the same time the temperature was increased to 380° C. The reaction was continued at this temperature and under a pressure of 3 mbar for a further 20 minutes. The product finally solidified. After cooling, a pale brown polyester was obtained.

In the DSC investigation, a fusion peak was observed at 380° C. (total heat of fusion: 9.3 cal/g).

Under the polarization microscope, an anisotropic melt phase was observed at temperatures above 385° C.

In the thermogravimetric analysis (isothermal, 30 minutes at 400° C.), a weight loss of 2.1% occurred.

The Vicat A temperature of the polyester was 345° C. The product was insoluble in all solvents tested.

EXAMPLE 3

The following substances were weighed into the reaction apparatus described in Example 1:
95.45 g=0.3 mol of diphenyl terephthalate,
96.33 g=0.285 mol of 3,3'-diphenyl-4,4'-dihydroxydiphenyl,
1.65 g=0.015 mol of hydroquinone and 0.01 g of sodium phenolate.

A beige coloured product was obtained by the reaction process described in Example 1. The polyester had the following properties:
Melting point: 365° C.
Anisotropic melt phase: above 370° C.
TGA (30 min/400° C.): 1.4% weight loss
Vicat A temperature: 290° C.

EXAMPLES 4-12

Further polyesters were prepared in the apparatus described in Example 1 and according to the process described there. The individual compositions and the results of the characterization are summarized in Tables 1 and 2 below:

TABLE 1

| Example | DPT* | DPDOD** | Codiol | $T_m$*** | Anisotropic melt | Vicat A temperature | TGA*** |
|---|---|---|---|---|---|---|---|
| 4 | 0.3 mol | 0.27 mol | 0.03 mol Hy[1] | 355° C. | >360° C. | 250° C. | 2.1% |
| 5 | 0.3 mol | 0.27 mol | 0.03 mol BPA[2] | 375° C. | >260° C. | 260 ° C. | 1.7% |
| 6 | 0.3 mol | 0.27 mol | 0.03 mol Res[3] | 350° C. | >350° C. | 240° C. | 1.9% |
| 7 | 0.3 mol | 0.28 mol | 0.02 mol Res[3] | 360° C. | >365° C. | 270° C. | 2.4% |
| 8 | 0.3 mol | 0.27 mol | 0.03 mol DOD[4] | 375° C. | >380° C. | 300° C. | 1.1% |

*diphenyl terephthalate
**3,3'-diphenyl-4,4'-dihydroxydiphenyl
***melting point (determined via DSC)
****weight loss after 30 minutes at 400° C.
[1]hydroquinone
[2]bisphenol A
[3]resorcinol
[4]4,4'-dihydroxydiphenyl

TABLE 2

| Example | DPDOD* | DPT** | Coacid | $T_m$*** | Anisotropic melt | Vicat A temperature | TGA*** |
|---|---|---|---|---|---|---|---|
| 9 | 0.3 mol | 0.27 mol | 0.03 mol IS[1] | 370° C. | >375° C. | 310° C. | 1.4% |
| 10 | 0.3 mol | 0.27 mol | 0.3 mol BPCD[2] | 360° C. | >360° C. | 295° C. | 1.8% |
| 11 | 0.3 mol | 0.27 mol | 0.03 mol DEDC[3] | 355° C. | >360° C. | 305° C. | 0.9% |
| 12 | 0.3 mol | 0.285 mol | 0.015 mol IS[1] | 370° C. | >375° C. | 305° C. | 1.2% |

*3,3'-diphenyl-4,4'-dihydroxydiphenyl
**diphenyl terephthalate
***melting point (determined via DSC)
****weight loss after 30 minutes at 400° C.
[1]diphenyl isophthalate
[2]diphenyl 4,4'-benzophenonedicarboxylate
[3]diphenyl 4,4'(diphenyl ether)-dicarboxylate

We claim:

1. Thermotropic polyester comprising the polymeric reaction product of at least one aromatic dicarboxylic acid and at least one diphenol wherein at least 90 mol percent of the diphenol is 3,3'-diphenyl-4,4'-dihydroxydiphenyl and the dicarboxylic acid is of the formula

HOOC—A—COOH wherein, A is an aromatic moiety having 6 to 24 carbon atoms.

2. Polyester according to claim 1 wherein at least 95 mol % of the diphenol radicals are 3,3'-diphenyl-4,4'-dihydroxydiphenyl radicals.

3. Polyester according to claim 1 wherein at least 98 mol. % of the diphenols are 3,3'-diphenyl-4,4'-dihydroxydiphenyl radicals.

4. Polyester according to claim 1 wherein the diphenol radicals consist completely of 3,3'-diphenyl radicals-4,4'-dihydroxydiphenyl radicals.

5. Polyesters according to claim 1 wherein the aromatic dicarboxylic acid radicals are terephthalic acid radicals.

6. Thermotropic polyester according to claim 1 wherein the reaction product further comprises co-reacted 0.5 to 5 mol percent, monohydroxy chain terminator.

7. Thermotropic polyester according to claim 1 wherein the reaction product further comprises co-reacted 0.5 to 5 mol percent, based on dicarboxylic acid, of a monocarboxylic acid chain terminator.

8. Thermotropic polyester according to claim 1 wherein the reaction product further comprises co-reacted branching agent which is 0.1 to 1 mol percent of an at least trifunctional hydroxy compound, based on diphenol.

9. Thermotropic polyester according to claim 1 wherein the reaction product further comprises co-reacted branching agent which is 0.1 to 1 mol percent of an at least trifunctional carboxylic acid, based on dicarboxylic acid.

10. Thermotropic polyester according to claim 1 wherein the reaction product further comprises coreacted branching agent which is 0.1 to 1 mol percent of a hydroxy-carboxylic acid, based on dicarboxylic acid.

11. Thermotropic polyester according to claim 1 wherein the reaction product further comprises as the dicarboxylic acid coreacted amounts of up to 10 mol percent of aliphatic dicarboxylic acid having 40 to 14 carbon atoms, cycloaliphatic dicarboxylic acid having 8 to 16 carbon atoms, araliphatic dicarboxylic acid having 10 to 18 carbon atoms, or hydroxycarboxylic acid having 7 to 19 carbon atoms.

12. Thermotropic polyester according to claim 1 wherein the reaction product further comprises as the dicarboxylic acid a mixture of aromatic dicarboxylic acid species.

13. A molding, filament, fiber or film of the polyester according to claim 1.

14. Process for the preparation of the polyesters according to claim 1 wherein diacetates of the diphenol are reacted with the dicarboxylic acids at a temperature from 160° to 400° C.

15. Process for the preparation of the polyester according to claim 14 wherein the diphenyl dicarboxylates are reacted with the diphenols at temperatures from 250° to 400° C. and under a pressure of 0.1 to 1000 mbar.

* * * * *